2,101,934

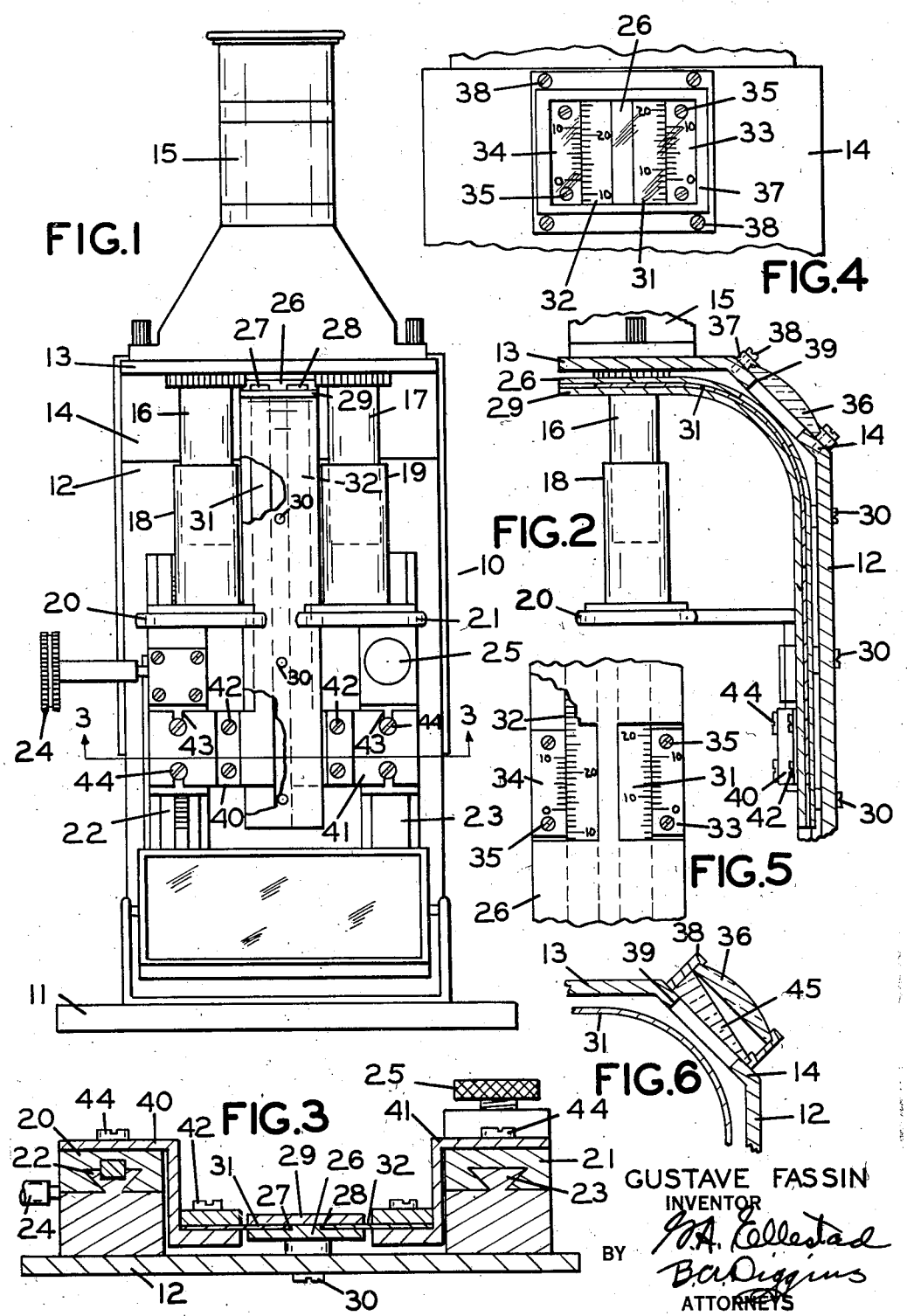
Dec. 14, 1937.     G. FASSIN     2,101,934
COLORIMETER
Filed Feb. 25, 1936
GUSTAVE FASSIN
INVENTOR Patented Dec. 14, 1937

UNITED STATES PATENT OFFICE 2,101,934

COLORIMETER

Gustave Fassin, Irondequoit, N. Y., assignor to Bausch & Lomb Optical Company, Rochester, N. Y., a corporation of New York Application February 25, 1936, Serial No. 65,651

5 Claims. (Cl. 88—14)

The present invention relates to colorimeters or the like and more particularly to indicating or measuring means for such instruments.

Heretofore the indicating or measuring systems of colorimeters have been of two general types. Either opaque scales and verniers were mounted on the side of the instrument, or transilluminated scales and verniers were used and the numbers were viewed by means of a prism. Each of these systems presents inherent difficulties, the scale of the former system being awkward to view and the latter system being expensive to make and having the scale numbers at an uncomfortable viewing distance.

One of the objects of the present invention is to provide a colorimeter having the indicating or measuring means in a position where it can be comfortably and conveniently viewed. Another object is to provide a colorimeter in which the scale and vernier face upwardly. Another object is to provide a colorimeter in which the scale and vernier are located adjacent the observation system. A still further object is to provide a colorimeter having a flexible scale which is guided in a curved path so as to face upwardly adjacent the vernier. These and other objects and advantages reside in certain novel features of construction, arrangement and combination of parts as will hereinafter be more fully set forth and pointed out in the appended claims.

Referring to the drawing:

Fig. 1 is a front elevation of a colorimeter embodying this invention.

Fig. 2 is a fragmentary vertical section thereof.

Fig. 3 is a horizontal section taken on line 3—3 of Fig. 1.

Fig. 4 is a detail view of the window and scales.

Fig. 5 is a fragmentary detail view of the guide and scales with parts broken away.

Fig. 6 is a fragmentary section similar to that of Fig. 2 showing a modified form of window.

One embodiment of this invention is illustrated in the drawing wherein 10 indicates a colorimeter of well known type having a base 11, a vertical wall 12, a horizontal platform 13 and an inclined wall 14 connecting the vertical wall 12 and platform 13. The platform 13 carries the usual observation system 15 and the two plungers 16 and 17. The two specimen cups 18 and 19 are mounted on carriages 20 and 21 which are vertically slidable, respectively, on dovetail guides 22 and 23 secured to the vertical wall 12. The carriage 20 and cup 18 are moved vertically by the usual rack and pinion mechanism indicated generally at 24 and the carriage 21 and cup 19 are merely raised and lowered by hand and locked in position by a set screw 25.

A guide 26 having two guide slots 27 and 28 and a cover plate 29 is fixed to the wall 12 by screws 30 and extends vertically upward along the wall 12, bending beneath the wall 14 and terminating in a horizontal plane beneath the platform 13. Two flexible scale members 31 and 32 of steel or the like, are slidably mounted in the guide slots 27 and 28. Opposite the wall 14, the back of the guide 26 is cut away and two verniers 33 and 34 are secured to the guide 26 by screws 35 to cooperate with the exposed scale members 31 and 32, respectively. The scales 31 and 32 and verniers 33 and 34 can be viewed through a lens 36 secured to the wall 14 by a frame 37 and screws 38 opposite the opening 39.

The scales 31 and 32 are secured at their lower ends to brackets 40 and 41, respectively, by screws 42 and each of these brackets is provided with slots 43 for engagement with screws 44 on the carriages 20 and 21, respectively. It can thus be seen that when the screws 44 are tightened, movement of the carriages 20 and 22 will cause movement of the scales 31 and 32 through the guide 26 past the verniers 33 and 34. The slots 43 engaging the screws 44 permit a slight movement of the scales 31 and 32 relative to the carriages 20 and 21 for setting the zero position.

In the modification shown in Fig. 6, a prism 45 between the lens 36 and the scales 31 and 32 permits observation of the scales and verniers from a point immediately adjacent the eyepiece of the observation system 15.

From the foregoing it will be apparent that I am able to attain the objects of my invention and provide a simple and inexpensive system for locating the colorimeter scales in a position wherein they may be conveniently and comfortably read. By making the scales of flexible material it is possible to guide them around a curved path thus making it possible to make readings from a point adjacent the observation system. Although I have described my invention as applied to a colorimeter, obviously it could be used with other instruments. Various modifications can, of course, be made without departing from the spirit of my invention or the scope of the appended claims.

I claim:

1. A colorimeter having in combination a base, a vertical wall carried by said base, a non-vertical wall carried at the upper end of said vertical wall, a downwardly facing window in said non-vertical wall, a horizontal platform carried by said non-vertical wall, an observation system mounted on said platform, two plungers secured on said platform below said observation system, two specimen cups vertically movably mounted on said vertical wall one beneath each plunger, a flexible scale member secured to each cup, and means for guiding said scale members beneath said window.

2. In a colorimeter having a support, an observation system thereon, a pair of plunger members mounted on said support, a pair of cup members mounted on said support and means for vertically moving each of one pair of members independently, a curved guide having a vertical portion and a portion facing upwardly adjacent said observation system, two flexible scale members slidable in said guide and fixed one to each of said movable members, and index means fixed relative to said support for cooperating with said flexible scale members.

3. In a colorimeter, a support, an observation system carried thereby, a downwardly facing window adjacent said observation system, a pair of plunger members mounted on said support, a pair of cup members mounted on said support, means for independently vertically moving each of one of said pairs of members, a vertical guide carried by said support and having a non-vertical portion beneath said window, two flexible scales slidably mounted in said guide and secured one to each of said movable members and an index mark fixedly carried by said support beneath said window to cooperate with said scale.

4. In a colorimeter having a support, two plungers and an observation system therefor, a downwardly facing window adjacent the top part of said support, carriages movably mounted on said support, specimen cups mounted on said carriages beneath said plungers, a guide fixed on said support, said guide being curved beneath said window, a flexible scale secured to each of said carriages and passing through said guide, and an index mark fixedly carried by said support adjacent said window for cooperation with said scale.

5. In a colorimeter, a support, an observation system carried by said support, a pair of plunger members carried by said support, a pair of cup members carried by said support in axial alignment with said plunger members, means for moving each of one pair of members independently, curved guide means having an opening in the curved portion close to said observation system, two flexible scale members slidable in said guide means and fixed one to each of said movable members, and index means fixed relative to said support for cooperating with said flexible scale members at said opening.

GUSTAVE FASSIN.